(12) United States Patent
Muller et al.

(10) Patent No.: US 12,447,426 B2
(45) Date of Patent: Oct. 21, 2025

(54) METHOD AND DEVICE FOR GENERATING AN ALARM FOR MONITORING AN OIL FILTER IN AN AIRCRAFT

(71) Applicant: SAFRAN AIRCRAFT ENGINES, Paris (FR)

(72) Inventors: Jean-Louis Muller, Moissy-Cramayel (FR); Thibault Maxime Adrien Mallet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 111 days.

(21) Appl. No.: 18/547,642

(22) PCT Filed: Feb. 18, 2022

(86) PCT No.: PCT/FR2022/050292
§ 371 (c)(1),
(2) Date: Aug. 23, 2023

(87) PCT Pub. No.: WO2022/180327
PCT Pub. Date: Sep. 1, 2022

(65) Prior Publication Data
US 2024/0131457 A1 Apr. 25, 2024
US 2024/0226783 A9 Jul. 11, 2024

(30) Foreign Application Priority Data
Feb. 24, 2021 (FR) ........................... 2101796

(51) Int. Cl.
G08B 21/00 (2006.01)
B01D 35/143 (2006.01)
B64D 45/00 (2006.01)

(52) U.S. Cl.
CPC ......... B01D 35/1435 (2013.01); B64D 45/00 (2013.01)

(58) Field of Classification Search
CPC . B01D 35/1435; B64D 45/00; F05D 2260/80; F02C 7/06
(Continued)

(56) References Cited

U.S. PATENT DOCUMENTS 6,134,815 A * 10/2000 Rohr .................. E02F 3/4131
37/340
2002/0193933 A1* 12/2002 Adibhatla ................ F02C 9/28
701/1
(Continued)

FOREIGN PATENT DOCUMENTS
FR 2949352 A1 3/2011
FR 3013389 A1 5/2015
FR 3030624 A1 6/2016

OTHER PUBLICATIONS

Search Report and Written Opinion issued in International Application No. PCT/FR2022/050292, mailed on Jun. 17, 2022.
(Continued)

*Primary Examiner* — Tai T Nguyen
(74) *Attorney, Agent, or Firm* — Bookoff McAndrews, PLLC

(57) ABSTRACT

A method for generating an alarm is implemented by an alarm-generating device installed in an aircraft. It comprises: a step of obtaining information delivered by a sensor of said device and representative of an oil flow rate inside an oil filter of the aircraft; a step of obtaining a temperature delivered by a sensor of said device and representative of a temperature of the oil inside said filter; a step of obtaining a differential pressure at said filter; and a step of generating an alarm if the differential pressure exceeds an alarm threshold obtained on the basis of said information and of said temperature.

14 Claims, 6 Drawing Sheets

(58) Field of Classification Search
USPC .......................................................... 340/945
See application file for complete search history.

(56) References Cited

U.S. PATENT DOCUMENTS

2009/0234533 A1\* 9/2009 Trinkner ................ F01M 11/10
702/55
2012/0074069 A1 3/2012 Ripley et al.

OTHER PUBLICATIONS

Search Report issued in French Application No. FR 2101796, mailed on Oct. 26, 2021.

\* cited by examiner

[Fig. 1]
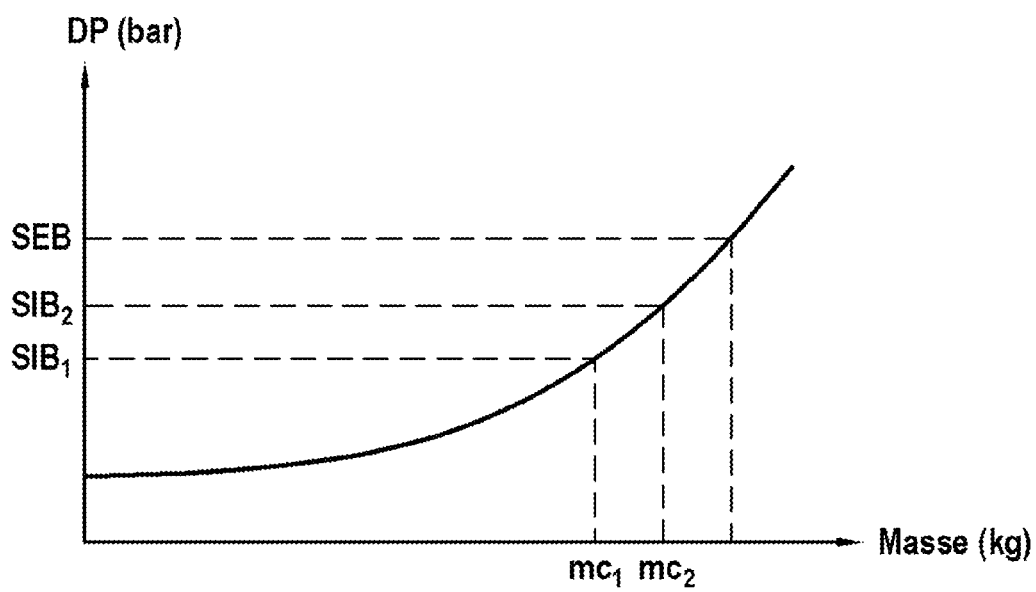
[Fig. 2]
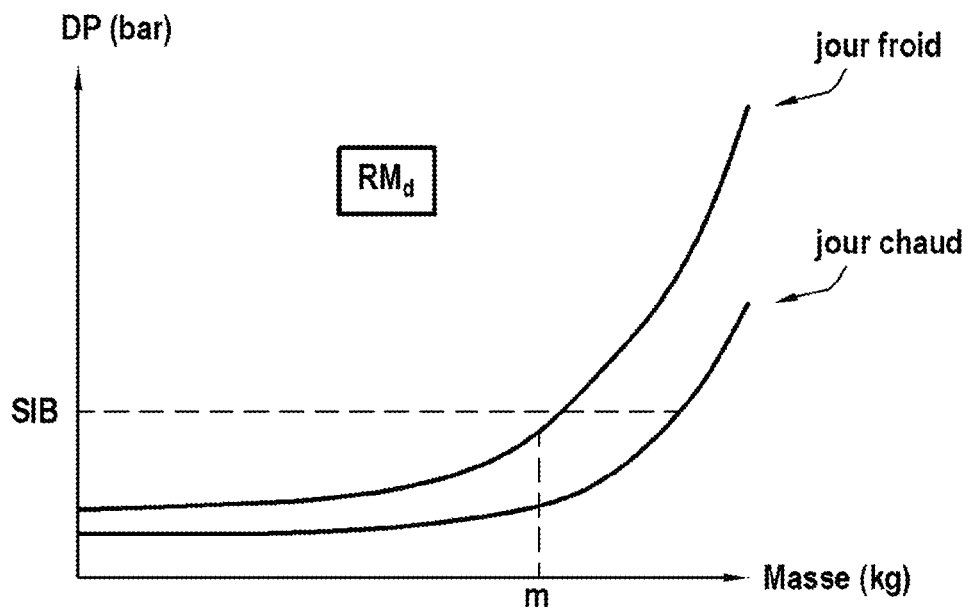

[Fig. 3]
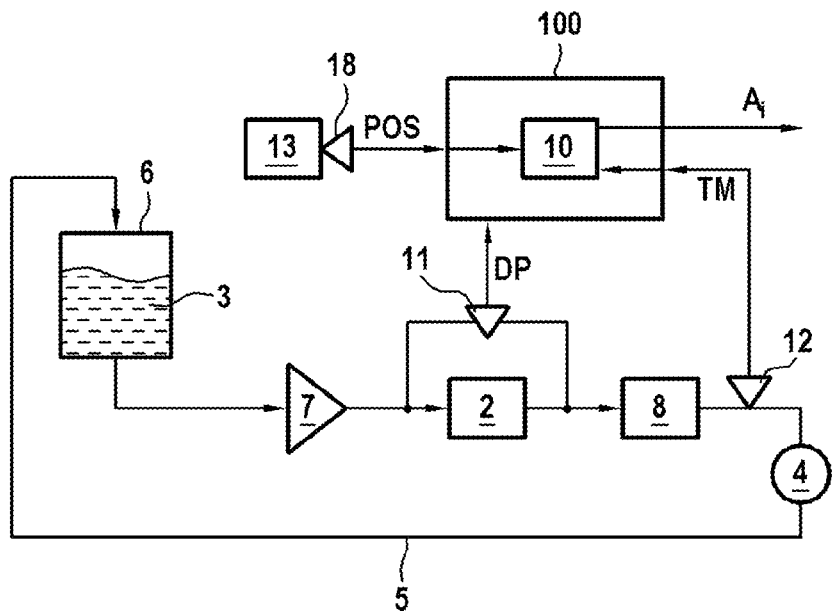
[Fig. 4]
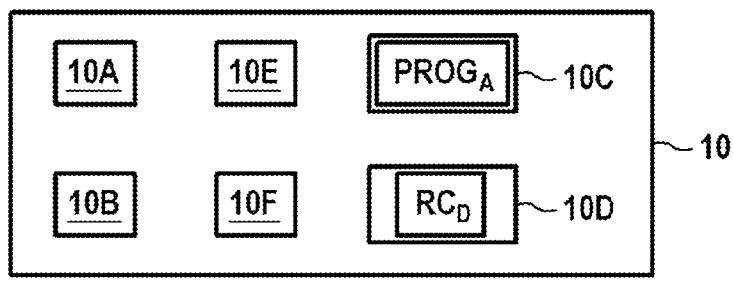
[Fig. 5]
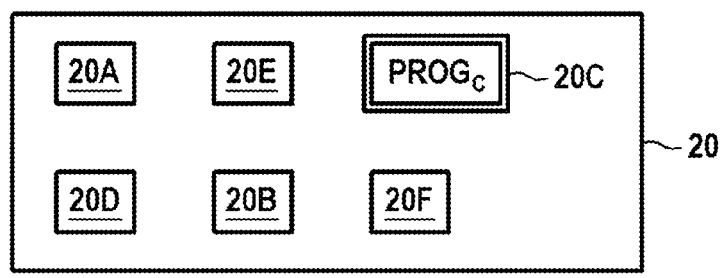

[Fig. 6]
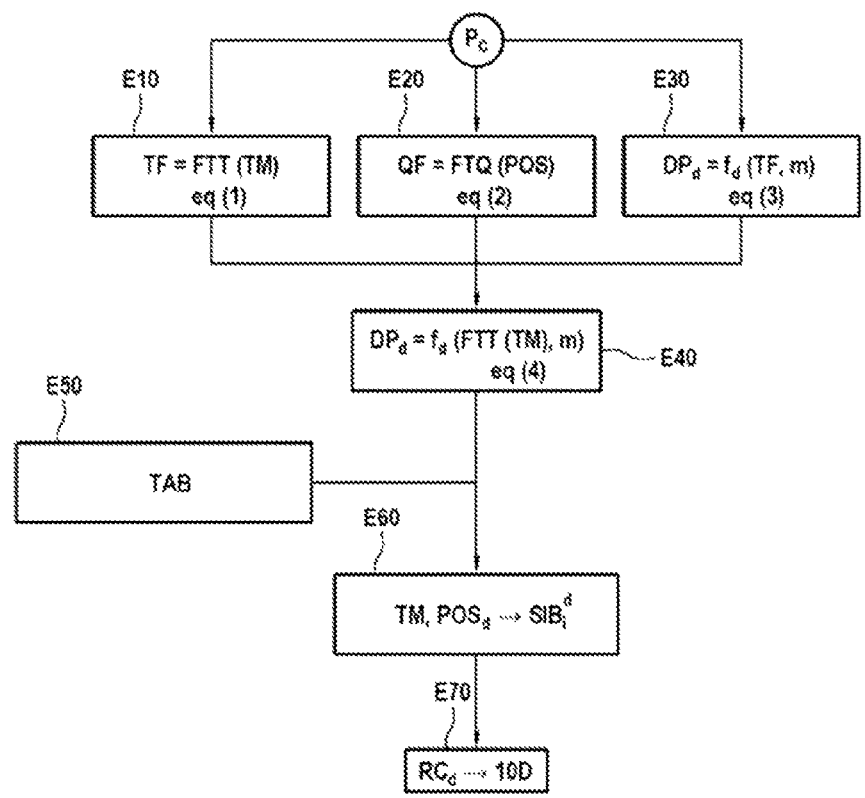

[Fig. 7]
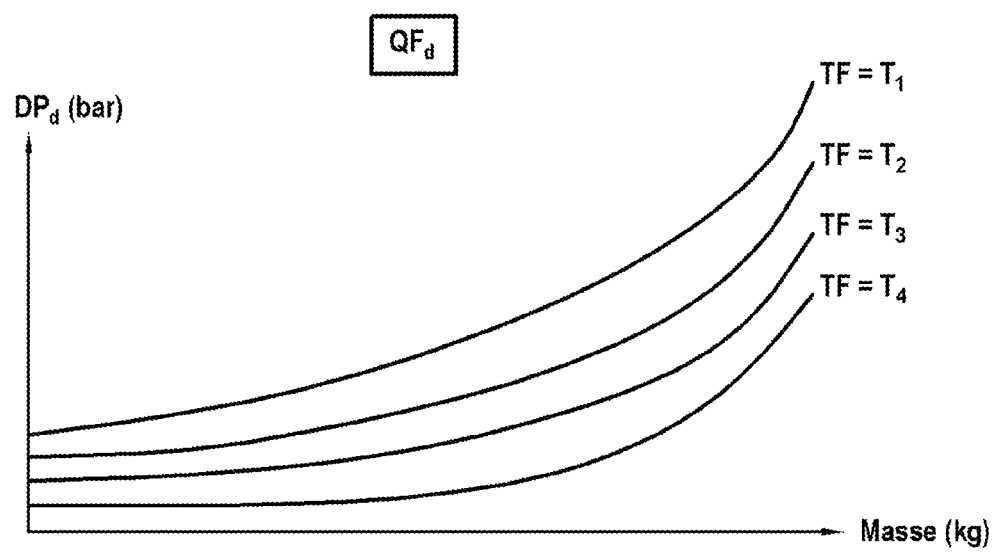
[Fig. 8]
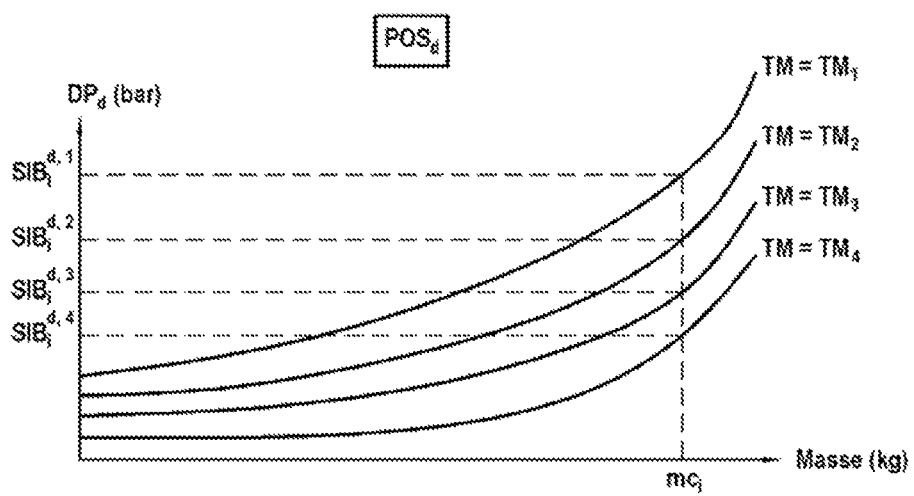

[Fig. 9]
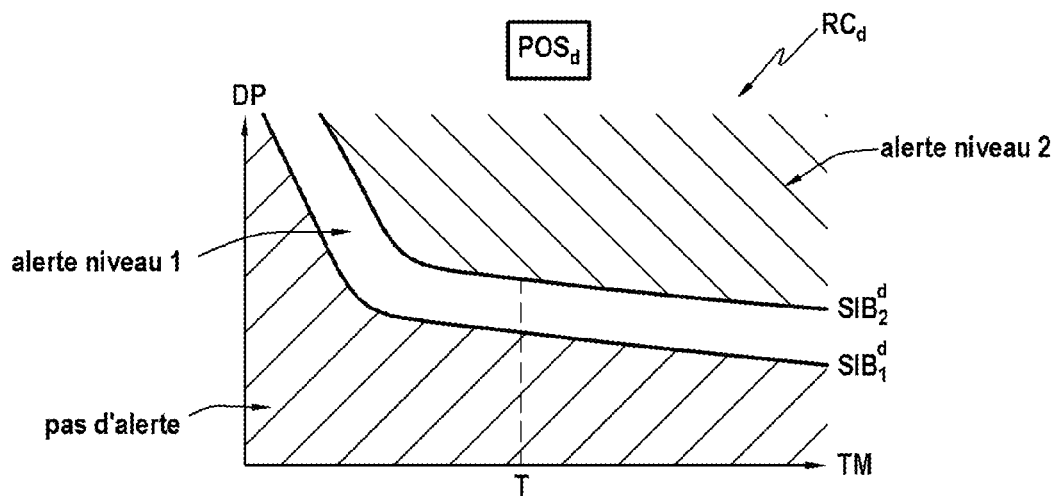
[Fig. 10]
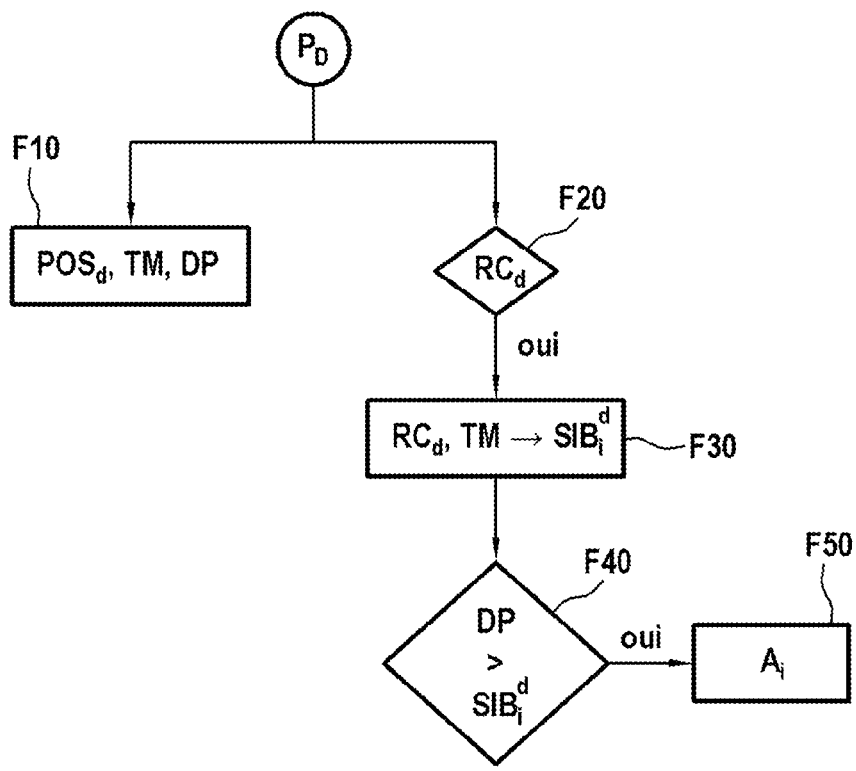

[Fig. 11]
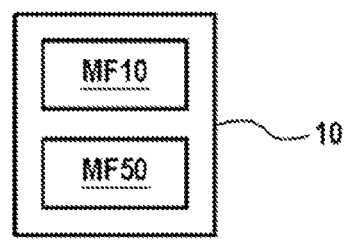
[Fig. 12]
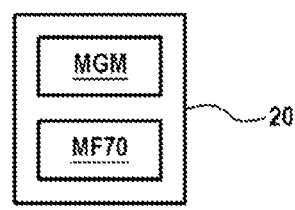

METHOD AND DEVICE FOR GENERATING AN ALARM FOR MONITORING AN OIL FILTER IN AN AIRCRAFT

CROSS-REFERENCE TO RELATED APPLICATIONS

This is a National Stage Application under 35 U.S.C. § 371 of International Application No. PCT/FR2022/050292, filed Feb. 18, 2022, now published as WO 2022/180327 A1, which claims priority to French Patent Application No. 2101796, filed on Feb. 24, 2021.

PRIOR ART

This invention relates to the general field of aeronautics.

It more specifically relates to the monitoring of an oil filter installed in an oil circuit of an aircraft engine.

Such a filter catches the particles of contaminant present in oil using a filtering element made of a porous material. This catching of particles leads to the modification of the permeability of the material which manifests, at constant operating conditions (e.g. at constant flow rate and viscosity of the oil), as an increase in the differential pressure at the filter.

FIG. 1 illustrates a typical behavior of variation in the differential pressure DP at an oil filter as a function of the mass m of particles of contaminant contained in the filter. This phenomenon, known as clogging, increases the resistance of the filter to the passage of oil and increases the load losses thereof. This can take more or less time depending on the exposure of the filter to the contamination conveyed by the particles.

When the differential pressure reaches the limit value for which the filter was designed, the filtering element of the filter should be replaced.

In accordance with the regulations in effect, in a proven clogging situation, when the differential pressure DP exceeds an effective bypass threshold SEB, a discharge valve opens through which the oil flows out, limiting the flow passing through the filter and the pressure increase. This opening is accompanied by a notification to the crew. The differential pressure SEB above which the valve must open is a specification datum of the filter.

In a known manner, certain aircraft manufacturers desire one or more alarms to be escalated to the cockpit to inform the pilot that the filter should be changed, in a so-called "impending bypass" situation.

In the example in FIG. 1:
a first alarm must be escalated when the mass of contaminant particles contained in the filter reaches a critical mass $mc_1$, and
a second alarm must be escalated when the mass of contaminant particles contained in the filter reaches a critical mass $mc_2$.

Consequently, in the example of FIG. 1:
the first alarm is escalated when the differential pressure DP exceeds a first alarm threshold $SIB_1$ corresponding to the critical mass $mc_i$; and
a second alarm can be escalated when the differential pressure DP exceeds a first alarm threshold $SIB_2$ corresponding to the critical mass $mc_2$.

The impending bypass alarm thresholds $SIB_i$ are lower than the effective bypass threshold SEB.

Moreover, and as illustrated in FIG. 2, it is known that for a given engine rating, a filter responds differently to one and the same level of obstruction according to the ambient temperature. This phenomenon is particularly and mainly explained by the fact that the engine temperature of the oil is correlated with the ambient temperature, and that the viscosity of the oil decreases when the temperature of the oil increases.

FIG. 2 for example illustrates the response of an aircraft filter in the take-off rating on a hot day and on a cold day for an engine rating $RM_d$.

The curves of FIG. 2 are examples of permeability curves of the filter for this engine rating $RM_d$. In this figure, and by way of purely illustrative example, for a mass m of contaminant particles contained in the filter, it appears that the differential pressure DP in the oil filter is substantially twice as high on a cold day as on a hot day.

However, during a flight, the ambient temperature is liable to vary greatly, for example if the aircraft takes off in a hot country to land in a cold country.

It is therefore difficult to define an impending bypass alarm threshold $SIB_i$. Specifically:
if the threshold $SIB_i$ is set relatively low to trigger an alarm early enough on a hot day, alarms will be triggered much too early on a cold day; and
if the threshold $SIB_i$ is set relatively high to avoid triggering an alarm too early on a cold day, there is a risk that the alarm will not be triggered on a hot day.

The invention pertains to an alarm mechanism which does not have these drawbacks.

SUMMARY OF THE INVENTION

This invention meets this need by making provision for a method for generating an alarm in an aircraft, this method being implemented in an alarm-generating device installed in the aircraft and including:
a step of obtaining an item of information delivered by a sensor of the device and representative of an oil flow rate inside an oil filter of the aircraft;
a step of obtaining a temperature delivered by a sensor of the device and representative of a temperature of the oil inside the filter;
a step of obtaining a differential pressure at the filter; and
a step of generating an alarm if the differential pressure exceeds an alarm threshold obtained as a function of said information and of said temperature.

Correspondingly, the invention relates to a device for generating an alarm in an aircraft, this device including:
a module for obtaining an item of information delivered by a sensor of said device and representative of an oil flow rate inside an oil filter of the aircraft;
a module for obtaining a temperature delivered by a sensor of said device and representative of a temperature of the oil inside said filter;
a module for obtaining a differential pressure at the filter; and
a module for generating an alarm configured to generate an alarm if the differential pressure exceeds an alarm threshold determined as a function of said information and of said temperature.

Thus, and in general, the invention makes provision for defining variable alarm thresholds which depend on parameters intrinsic to the oil filter, namely the oil flow rate in the filter and the temperature of the oil inside the filter.

In an embodiment of the invention, the temperature representative of a temperature of the oil inside the filter is delivered by a temperature sensor able to measure the temperature of the oil in the filter.

In an embodiment of the invention, the temperature representative of a temperature of the oil inside the filter is delivered by a temperature sensor able to measure the temperature of the oil in the circuit but outside the filter. The temperature of the oil measured outside the filter may be different from the temperature of the oil inside the filter.

In an embodiment of the invention, the item of information representative of an oil flow rate inside the oil filter is supplied by a flow meter at the inlet of the oil filter, for example a turbine.

In an embodiment of the invention, the item of information representative of an oil flow rate inside the oil filter is a position of a lever delivering a setpoint to the aircraft engine.

This setpoint is for example a rating or thrust or power setpoint.

In this invention, the word "sensor" denotes any type of component or equipment item able to deliver a measurement or a state of an operating parameter of a state.

In accordance with the invention, the alarm-generating device does not perform any computation to determine the intrinsic parameters of the filter: either the device has sensors to directly obtain the intrinsic parameters of the filter, or the device dispenses with these parameters by using substitute parameters accessible by sensors of the device.

The parameters obtained by the sensors of the alarm-generating device (intrinsic parameters or substitute parameters) allow the device to determine an alarm threshold adapted to the rating of the aircraft and to the temperature conditions.

Consequently, the alarm-generating method according to the invention requires only a very small number of operations:
- reading a sensor to obtain a temperature representative of a temperature of the oil inside said filter;
- reading a sensor to obtain an item of information representative of the oil flow rate in the filter;
- reading in the non-volatile memory of the device to determine the alarm threshold as a function of these two parameters;
- reading a sensor to obtain a differential pressure at the oil filter; and
  - a simple comparison of this differential pressure with the alarm threshold to determine whether or not an impending bypass alarm should be triggered.

According to a second aspect, the invention relates to a method for creating a model intended to be used by an alarm-generating device installed in an aircraft, this alarm-generating device being configured to generate at least one alarm when a differential pressure at an oil filter of the aircraft exceeds an alarm threshold, this method including:
- a step of generating said model, this model allowing the device to obtain said alarm threshold based on:
  (i) a temperature delivered by a sensor of said device and representative of a temperature of the oil inside the filter; and
  (ii) an item of information delivered by a sensor of said device and representative of an oil flow rate of the oil inside said filter; and
- a step of storing said model in a non-volatile memory of said alarm-generating device.

Correspondingly, the invention relates to a device for creating a model intended to be used by an alarm-generating device installed in an aircraft, this alarm-generating device being configured to generate at least one alarm when a differential pressure at an oil filter of the aircraft exceeds an alarm threshold, this device including:
- a module for generating said model, this model allowing the alarm-generating device to obtain said alarm threshold based on:
  (i) a temperature delivered by a sensor of said device and representative of a temperature of the oil inside the filter; and
  (ii) an item of information delivered by a sensor of said device and representative of an oil flow rate of the oil inside the filter; and
- a module for storing said model in a non-volatile memory of said alarm-generating device.

Thus, all the complex computations of construction of the model are carried out during a design phase of the oil filter system.

In an embodiment of the invention, the creating method includes a step of determining a heat transfer function making it possible to estimate the (intrinsic) temperature of the oil inside the filter based on a (substitute) temperature measured by a sensor of the alarm-generating device at a point of an oil circuit of the aircraft outside the filter, said heat transfer function being used to generate said model.

In an embodiment of the invention, the creating method includes a step of determining a hydraulic transfer function making it possible to estimate the temperature of the oil inside the filter based on the position of a lever delivering a setpoint (for example rating, thrust or power) to the aircraft engine, said hydraulic transfer function being used to generate said model.

The position of the lever can be obtained by a sensor.

In an embodiment of the invention, the creating method includes for at least one oil flow rate in the filter, a step of determining a function for determining the differential pressure at the filter as a function of the temperature of the oil in the filter and of a mass of particles of a contaminant contained in the filter, said function being used to generate said model.

In an embodiment of the invention, the creating method includes a step of determining the alarm threshold as a function of a critical mass of contaminant particles contained in the filter.

The choice of the operating points (or engine ratings) for which a model is established can be made according to the performance of the differential pressure sensor.

In a particular embodiment of the invention, for example if the differential pressure sensor is of low accuracy, the model is obtained for a single position of the setpoint lever, namely, in this example, for a position corresponding to the take-off rating.

This is because take-off is the flight phase in which the differential pressure at the filter is maximal. It can be measured with a sensor of moderate effectiveness.

On the other hand, if the filtering system of the aircraft includes an effective differential pressure sensor, usable measurements may be obtained even with a small load loss at the oil filter.

Under these conditions, it may be beneficial to implement the invention, for other ratings of the engine, for example for the cruise rating in such a way as to be able to trigger an alarm during the cruise rating, without waiting for the next take-off rating, if an impending bypass condition is detected, for example following the failure of a bearing, without waiting for the next take-off.

In a particular embodiment of the invention, the different steps of the alarm-generating method and the different steps of the creating method are determined by computer program instructions.

Consequently, the invention also relates to a computer program on an information medium, this program being able to be implemented in a monitoring system or more generally in a computer, this program including instructions suitable for implementing the steps of a method as described above.

This program may use any programming language, and be in the form of source code, object code, or intermediate code between source code and object code, such as in a partially compiled form, or in any other desirable form.

The invention also relates to an information medium readable by a computer, and including instructions of a computer program as mentioned above.

The information medium can be any entity of the device capable of storing the program. For example, the medium can include a storage means, such as a ROM, for example a CD-ROM or a microelectronic circuit ROM, or else a magnetic recording means, for example a hard disk.

Moreover, the information medium can be a transmissible medium such as an electrical or optical signal, which can be conveyed via an electrical or optical cable, by radio or by other means. The program according to the invention can in particular be downloaded over an Internet-type network.

Alternatively, the information medium can be an integrated circuit into which the program is incorporated, the circuit being suitable for executing or for being used in the execution of the method in question.

BRIEF DESCRIPTION OF THE DRAWINGS

Other features and advantages of this invention will become apparent from the description below, with reference to the appended drawings which illustrate an exemplary embodiment thereof without any limitation. In the figures:

FIG. 1 already described illustrates the variation in the differential pressure in a filter as a function of the mass of contaminant particles contained in the filter at a given oil flow rate;

FIG. 2 already described shows the responses of an oil filter as a function of the ambient temperature;

FIG. 3 shows an alarm-generating device in accordance with the invention in its environment;

FIG. 4 shows the hardware architecture of an alarm-generating device in accordance with the invention;

FIG. 5 shows the hardware architecture of a creating device in accordance with the invention;

FIG. 6 shows, in the form of a flow chart, the main steps of a creating method in accordance with the invention;

FIG. 7 shows permeability curves of a filter for different oil temperatures in a filter;

FIG. 8 shows alarm thresholds associated with the permeability curves of FIG. 7;

FIG. 9 shows a set of curves defining alarm thresholds as a function of the temperature measured in the engine;

FIG. 10 shows, in the form of a flow chart, the main steps of an alarm-generating method in accordance with the invention;

FIG. 11 shows the functional architecture of an alarm-generating device in accordance with the invention;

FIG. 12 shows the hardware architecture of a creating device in accordance with the invention.

DESCRIPTION OF THE EMBODIMENTS

First Embodiment of the Invention

FIG. 3 shows an alarm-generating device 10 in accordance with a first embodiment of the invention in its environment.

This device 10 is incorporated into a computer 100 of an aircraft. It is configured to generate alarms $A_i$ intended for the cockpit of the aircraft when it detects an impending bypass situation of an oil filter 2.

The oil filter 2 is used to filter oil 3 injected into an engine 4 of the aircraft by way of a circuit 5 particularly including a reservoir 6, a feed pump 7, a heat exchanger 8 and ducts connecting these different equipment items.

In the embodiment described here, the engine 4 is a turbojet engine but no limitation is attached to the type of engine under consideration.

In the embodiment described here, and as shown in FIG. 4, the alarm-generating device 10 has the hardware architecture of a computer. It includes a processor 10A, a random-access memory 10B, a read-only memory 10C, a non-volatile flash memory 10D, input/output means 10E and communication means 10F.

These communication means 10F in particular allow the alarm-generating device 10 to obtain measurements of different operating aircrafts of the engine 4, in particular a measurement of the differential pressure DP at the filter 2, here taken by a differential pressure sensor 11, which, in this example is a sensor of gage bridge sensor type installed between the input and the output of the filter 2. Any other type of differential pressure sensor may be used.

In the embodiment described here, the alarm-generating device 10 includes a temperature sensor 12 able to measure the temperature TM of the oil at a point of the circuit 5.

In the embodiment described here, the sensor 12 is placed at the inlet of the engine 4, i.e. at the coldest point of the circuit 5, downstream of the heat exchanger 8. It is specifically recalled that the oil 3 is heated by the engine 4 and cooled by the heat exchanger 8.

In this embodiment of the invention, this temperature sensor 12 is not used only by the invention. It can for example also be used for generating an alarm when the oil temperature TM exceeds a threshold.

The terms "upstream" and "downstream" should here be understood to mean with respect to the direction of circulation of the fluid 3 in the circuit 5.

The temperature sensor 12 does not therefore directly measure the temperature TF at the filter 2 (intrinsic temperature).

In the embodiment described here, the alarm-generating device 10 includes a sensor 18 for obtaining the position POS of a lever 13 delivering a setpoint to the engine MOT, for example a rating setpoint (take-off, idling, climb, cruise, descent etc.).

In the embodiment described here, the non-volatile flash memory 10D includes, for at least one position $POS_d$ of the lever 13, a set of curves $RC_d$ defining the alarm thresholds $SIB_i^d$ for triggering the alarm $A_i$, as a function of the temperature TM measured in the circuit 5 by the sensor 12.

These set of curves $RC_d$ have been generated by a creating device 20 in accordance with a particular embodiment of the invention shown in FIG. 5.

In the embodiment described here, the creating device 20 has the hardware architecture of a computer. It includes a processor 20A, a random-access memory 20B, a read-only memory 20C, a non-volatile flash memory 20D, input/output means 20E and communication means 20F.

The read-only memory 20C of the creating device 20 constitutes a recording medium in accordance with the invention, readable by the processor 20A and on which is recorded a computer program PROGc in accordance with the invention, including instructions for executing the steps E10 to E70 of a creating method Pa in accordance with the invention and which will be described with reference to FIG. 6.

This device 20 is configured to generate set of curves $RC_d$ which are stored in the non-volatile flash memory 10D of the alarm-generating device 10 installed in the aircraft.

In this first embodiment of the invention, it is recalled:
that the (intrinsic) temperature TF of the oil in the filter 2 cannot be measured; and
that the (intrinsic) oil flow rate QF in the filter 2 (i.e. generated by the pump 7) cannot be measured.

In this first embodiment, the temperature TF of the oil in the filter can be estimated based on:
the temperature TM of the oil measured at a point of the circuit 5 by the sensor 12, outside the filter 2 (substitute temperature); and
a heat transfer function FTT between the temperature TM measured by the sensor 12 and the temperature of the oil TF in the filter 2.

In this first embodiment of the invention, the creating method includes a step E10 of determining the heat transfer function FTT, such that TF=FTT(TM) (equation (1)).

In this first embodiment, the oil flow rate QF in the filter 2 is estimated based on:
the position POS of the lever 13 delivering a rating, thrust or power setpoint to the engine 4 (substitute parameter); and
a hydraulic transfer function FTQ between the position POS of the lever 13 and the oil flow rate QF in the filter 2.

In this first embodiment of the invention, the creating method includes a step E20 of determining the hydraulic transfer function FTQ, such that QF=FTQ(POS) (equation (2)).

In another embodiment, the estimate of the oil flow rate QF can also take into account the temperature of the oil in the pump 7. This temperature can be estimated based on the temperature measured by the temperature sensor 12.

In this particular embodiment of the invention, the temperature transfer function FTT (or the hydraulic transfer function FTQ respectively) is determined based on a thermal numerical model (or based on a hydraulic numerical model) taking into account the particular features of the components of the oil circuit 5, this model being validated, refined or adjusted with actual measurements on an instrumented engine during the design phase.

In this embodiment of the invention, the engineers in charge of designing the filtering system possess for at least one oil flow rate QF d in the filter 2, data making it possible to estimate the differential pressure DP at the filter 2 as a function of:
the temperature TF of the oil in the filter 2, and
the mass m of contaminant particles contained in the filter 2.

These data are represented by way of example by the permeability curves of FIG. 7. To simplify, in this figure, the differential pressure DP d is illustrated for:
an oil flow rate $QF_d$ in the filter 2; and
four temperatures T1 to T4 of oil in the filter 2.

In this embodiment of the invention, the method for creating the oil system includes a step E30 of determining the differential pressure $DP_d$ at the filter 2 as a function of the temperature TF of the oil in the filter 2 and of the mass m of contaminant particles contained in the filter 2, for an oil flow rate $QF_d$ in the filter 2.

In this embodiment of the invention, the method for creating the oil system includes, for at least one position $POS_d$ of the lever 13, a step E40 of determining a function $f_d$ making it possible to obtain the differential pressure $DP_d$ at the filter 2 as a function of:
the temperature TM of the oil measured by the sensor 12 outside the filter; and
the mass m of contaminant particles contained in the filter 2 $DP_d=f_d$ (TF, m) (equation (3))

Specifically, by combining equations (1) and (3), one obtains:

$$DP_d = f_d(FTT(TM), m) \quad \text{(equation (4))}.$$

It is moreover advisable to set the pressure thresholds $SIB_i^d$ above which an alarm must be triggered. In practice, aircraft manufacturers define, for example, that an alarm $A_i$ must be triggered $H_i$ hours before the proven clogging situation occurs.

For example, the following may be chosen:
a first alarm $A_1$, must be triggered 1000H before the effective bypass ($H_1$=1000); and
a second alarm $A_2$ must be triggered 300H before the effective bypass ($H_2$=300).

In the embodiment described here, the creating method includes a step E50 for determining the critical mass $mc_i$ of contaminant particles contained in the filter at these times $H_i$. This critical mass $mc_i$, can foe example be obtained by $mc_i = mc_{EB} - H_i \times m^u$, wherein:
$mc_{EB}$ is the critical mass of contaminant above which the effective bypass (opening of the valve) must be implemented; and
$m^u$ is the mass of particles meant to be deposited in the filter per unit time.

One thus obtains a table TAB of alarm thresholds of the type:

| Alarm | Critical mass (kg) | Threshold (bar) |
|---|---|---|
| $A_1$ | $mc_1$ | $SIB_1$ |
| $A_2$ | $mc_2$ | $SIB_2$ |

Alarm thresholds $SIBi^{d, t}$ for a critical mass $mc_i$, are shown for example in FIG. 8, which again show the permeability curves of FIG. 7 (for four temperatures of engine oil $TM_t$, t=1 to 4) for a position $POS_d$ of the lever 13 corresponding to the flow rate $QF_d$.

These curves make it possible to obtain, in a step E60, the alarm thresholds $SIB_i^d$ as a function of the temperature TM of the oil measured by the sensor 12 dans the circuit 5, for a position $POS_d$ of the lever 13.

For example, in the embodiment described here, one thus obtains, for at least one position $POS_d$ of the lever 13, a set of curves $RC_d$ defining the alarm thresholds $SIB_i^d$, as a function of the temperature TM measured in the engine, as shown in FIG. 9.

In the example of FIG. 9, one considers for example two alarm levels, as in the example of FIG. 1.

During a step E70, these curve networks $RC_d$ are stored in the non-volatile flash memory 10D of the alarm-generating device 10 installed in the aircraft.

FIG. 10 shows the main steps of an alarm method in accordance with the invention, implemented by the alarm device 10 installed in the aircraft.

In the operational phase, the alarm device 10 constantly obtains (general step F10):
the position $POS_d$ of the lever 13;
the temperature TM measured by the sensor 12; and
the differential pressure DP measured by the sensor 11.

During a step F20, the alarm device 10 determines whether or not there exists in its non-volatile memory 10D a set of curves $RC_d$ for the position $POS_d$ of the lever 13.

If such is the case, during a step F30, the alarm device 10 determines based on the set of curves $RC_d$ and on the temperature TM, the alarm threshold $SIB_i^d$ for the alarm $A_i$.

During a step F40, the alarm device 10 compares the differential pressure DP measured by the sensor 11 to the temperature TM with the alarm threshold $SIB_i^d$.

If the alarm device 10 determines that the differential pressure DP measured by the sensor 11 is above the alarm threshold $SIB_i^d$, it triggers the alarm $A_i$ during a step F50.

As mentioned previously, it is possible to create a set of curves $RC_d$ for each engine rating, in other words for each position $POS_d$ of the lever 13 (take-off, idle, climb, cruise, descent etc.).

In a particular embodiment of the invention, during the design phase, the creating device 20 creates a single set of curves $RC_1$, corresponding to the take-off rating.

Take-off is the engine rating in which the flow rate in the filter 2 is the highest. The risk of clogging is increased and it is advisable to monitor the filter during this phase.

Moreover, the inventors have determined that this rating was advantageous since it is the one in which the sensor 11 measures the highest differential pressure DP at the filter 2. This embodiment of the invention is therefore less sensitive to measurement errors; it does not require a high-accuracy sensor 11.

Other Embodiments of the Invention

In the embodiment described here, the alarm thresholds $SIB_i^d$ are shown in the form of set of curves $RC_d$, but this is not limiting. Any data structure, for example a table, a chart etc. making it possible to express, for a given engine rating $RM_d$, the alarm threshold $SIB_i^d$ as a function of the temperature measured by a sensor of the device 10 can be used as a replacement for this set of curves.

In the first embodiment described previously, the creating device 20 estimates the temperature TF of the oil in the filter 2 based on the temperature measured by the sensor 12 at the inlet of the engine 4.

In a variant, the temperature TF of the oil in the filter 2 may be estimated based on a temperature of the oil measured at another point of the circuit 5.

A measurement of the ambient temperature may be used to consolidate the estimate of the temperature TF.

The temperature TF may also be used by a specific temperature sensor able to directly measure the temperature in the filter. In that case, the step E10 described previously is not necessary.

In the first embodiment previously described, the creating device 20 estimates the oil flow rate QF in the filter 2 based on the position of the lever 13 which provides the setpoints to the engine 4.

In another embodiment, the circuit 5 includes a flow rate regulator controlled by the computer 100. The command sent by the computer to regulate the flow rate or a state data sent back to the computer 100 by the regulator may be used to estimate the flow rate QF in the filter 2.

In another embodiment, the oil flow rate QF in the filter may be measured at the inlet of the filter 2, or at any other place on the circuit, by a flow meter, for example by a turbine. In that case, the step E20 previously described is not necessary.

The read-only memory 10C of the alarm device 10 constitutes a recording medium in accordance with the invention, readable by the processor 10A and on which is recorded a computer program $PROG_A$ in accordance with the invention, including instructions for executing the steps F10 to F50 of an alarm-generating method in accordance with the invention and which will be described with reference to FIG. 10.

The computer program $PROG_A$ defines functional modules of the alarm device 10 shown in FIG. 11 (here software modules), namely in particular:

a module MF10 configured to obtain:
(i) an item of information delivered by a sensor of the device and representative of an oil flow rate inside the filter 2 (for example a position of the lever 13, a command sent by a computer to a regulator to regulate the flow rate in the filter, a state datum sent back to the computer by the regulator, a measurement of the oil flow rate in the filter etc.);
(ii) a delivered temperature representative of a temperature of the oil inside the filter 2 (for example a temperature measured at another point of the circuit or in the filter itself);
(iii) a differential pressure DP at the filter 2; and
an alarm-generating module MF50 configured to generate an alarm $A_j$ if the differential pressure DP exceeds an alarm threshold $SIB_i^d$ determined as a function of the item of information (i) and of the temperature (ii).

In the embodiment described here, the creating device 20 also has the hardware architecture of a computer. It includes a processor 20A, a random access memory 20B, a read-only memory 20C, a non-volatile flash memory 20D, input/output means 20E and communication means 20F.

The read-only memory 20C of the creating device 20 constitutes a recording medium in accordance with the invention, readable by the processor 20A and on which is recorded a computer program $PROG_c$ in accordance with the invention, including instructions for executing steps E10 to E70 of a creating method Pa in accordance with the invention as described with reference to FIG. 6.

The computer program $PROG_c$ recorded in the read-only memory 20C defines functional modules of the creating device 20 shown in FIG. 12 (software modules here), namely in particular:

a module MGM for generating a model (set of curves, table, chart etc.) allowing the alarm-generating device 10 to obtain an alarm threshold $SIBi^d$ based on:
(i) a temperature delivered by a sensor of said device and representative of a temperature of the oil inside the filter 2; and
(ii) an item of information delivered by a sensor of the device 10 and representative of an oil flow rate of the oil inside said filter; and
a module ME70 for storing this model $RC_d$ in a non-volatile memory of the alarm-generating device 10.

The invention claimed is:

1. A method for generating an alarm in an aircraft being implemented by an alarm-generating device installed in said aircraft including:
obtaining a position of a lever delivered by a position sensor at a setpoint to an engine of the aircraft;
obtaining a temperature delivered by a temperature sensor of said device and representative of a temperature of an oil inside an oil filter used to filter the oil injected into said engine by way of a circuit particularly including a reservoir, a feed pump, a heat exchanger and ducts connecting these different equipment items, said sensor being placed at an inlet of the engine downstream of the heat exchanger;
obtaining a differential pressure delivered by a pressure sensor at said oil filter; and generating an alarm if the differential pressure exceeds an alarm threshold obtained as a function of said position of said lever and of said temperature, a non-volatile memory of said device including, for at least one position of the lever, a set of curves defining alarm thresholds for triggering said alarm, as a function of the temperature measured in the circuit by the sensor.

2. The alarm-generating method as claimed in claim 1, wherein said temperature representative of a temperature of the oil inside said filter being delivered by said temperature sensor able to measure the temperature of the oil outside the filter.

3. The generating method as claimed in claim 1, wherein a model is obtained for a position of said lever corresponding to a take-off rating of the aircraft.

4. A non-transitory computer readable medium having stored thereon instructions which, when executed by a processor, cause the processor to implement the method of claim 1.

5. A monitoring and alarm system for an oil filter in an aircraft, including:
 a position sensor for obtaining a position of a lever delivering a setpoint to an engine of the aircraft;
 an oil temperature sensor for obtaining oil temperature of the oil inside an oil filter used to filter the oil injected into said engine by way of a circuit particularly including a reservoir, a supply pump, a heat exchanger and ducts connecting these different equipment items, said oil temperature sensor being placed at an inlet of an engine downstream of the heat exchanger;
 a pressure system for obtaining a differential pressure at said filter; and
 an alarm device configured to generate an alarm if the differential pressure exceeds an alarm threshold determined as a function of said position of said lever and of said oil temperature, a non-volatile memory of said device including, for at least one position of the lever, a set of curves defining alarm thresholds for triggering said alarm, as a function of the temperature measured in the circuit by the sensors.

6. An aircraft including an alarm-generating device as claimed in claim 5.

7. A method for creating a model implemented by an alarm-generating device installed in an aircraft, wherein:
 said alarm-generating device being configured to generate at least one alarm when a differential pressure at an oil filter of an engine of the aircraft exceeds an alarm threshold,
 and wherein the method further includes:
 generating said model, this model allowing the device to obtain said alarm threshold based on:
 (i) a temperature delivered by a sensor of said device and representative of a temperature of the oil inside the filter, said sensor being placed at an inlet of the engine of the aircraft and downstream of a heat exchanger of the aircraft; and
 (ii) a position of a lever delivered by a position sensor delivering at a setpoint to said engine; and
 storing said model in a non-volatile memory of said alarm-generating device.

8. The creating method as claimed in claim 7, further including determining a heat transfer function making it possible to estimate the temperature of the oil inside the filter based on a temperature measured by said sensor, said heat transfer function being used to generate said model.

9. The creating method as claimed in claim 7, further including of determining a hydraulic transfer function making it possible to estimate an oil flow rate inside the filter based on a sensor of the position of the lever delivering at the setpoint to the engine of the aircraft, said hydraulic transfer function being used to generate said model.

10. The creating method as claimed in claim 9, wherein said model is obtained for a position of said lever corresponding to a take-off rating of the aircraft.

11. The creating method as claimed in claim 7, further including for at least one oil flow rate in the filter corresponding to the position of the lever, determining a function for determining said differential pressure as a function of said temperature of the oil in the filter and of a mass of particles of a contaminant contained in the filter, said function being used to generate said model.

12. The creating method as claimed in claim 7, further including determining said alarm threshold as a function of a critical mass of contaminant particles contained in the filter.

13. A non-transitory computer readable medium having stored thereon instructions which, when executed by a processor, cause the processor to implement method of claim 7.

14. A model creating device configure to create a model implemented for an alarm-generating device installed in an aircraft, wherein:
 said alarm-generating device is configured to generate at least one alarm when a differential pressure at an oil filter of the aircraft exceeds an alarm threshold,
 and wherein said model creating device includes:
 a module for generating said model, this model allowing the alarm-generating device to obtain said alarm threshold based on:
 (i) a temperature delivered by a sensor of said alarm generating device and representative of a temperature of the oil inside the filter, said sensor being placed at an inlet of an engine of the aircraft and downstream of a heat exchanger of the aircraft; and
 (ii) a position of a lever delivered by a position sensor delivering a setpoint to the engine; and
 a module for storing said model in a non-volatile memory of said alarm-generating device.

* * * * *